Figures 1, 2:
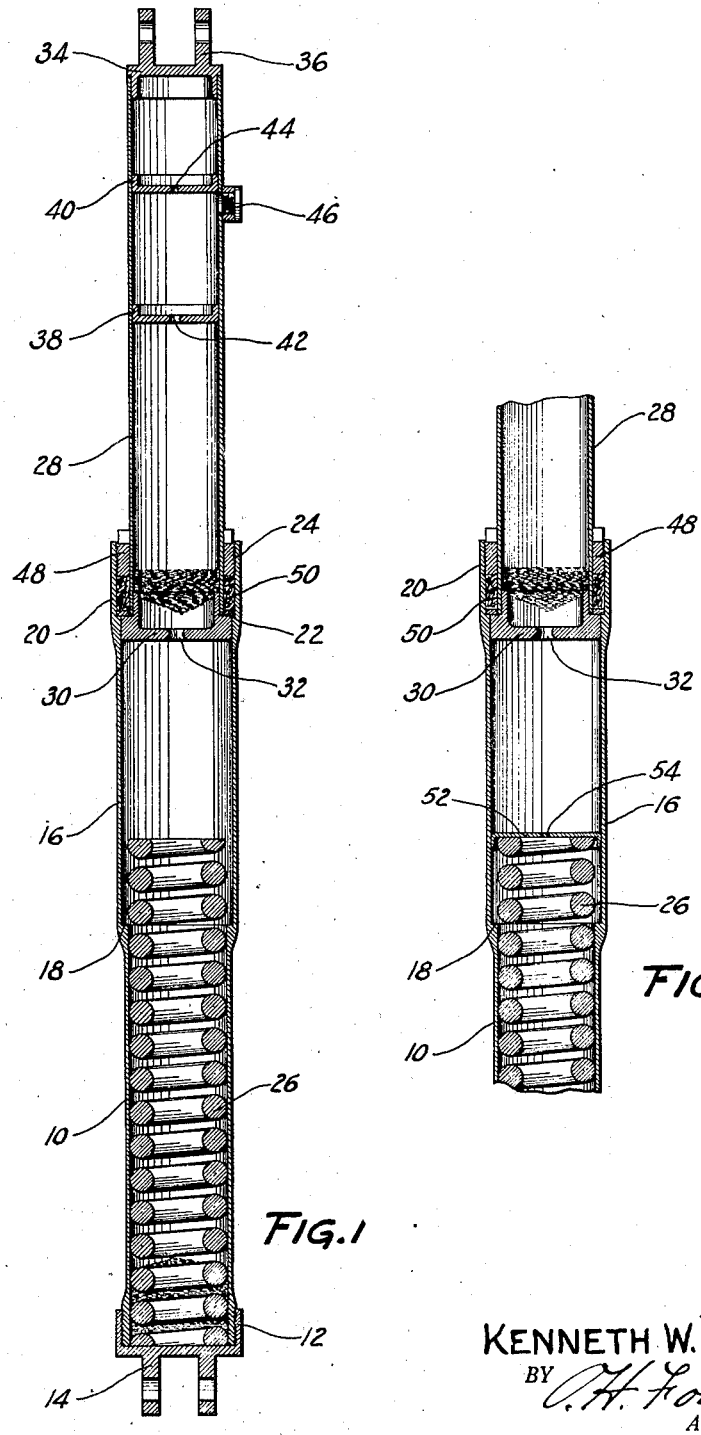

July 21, 1936.  K. W. WARREN  2,048,418
SHOCK ABSORBER STRUT
Filed Feb. 18, 1932

INVENTOR.
KENNETH W. WARREN
BY
ATTORNEY

Patented July 21, 1936

2,048,418

UNITED STATES PATENT OFFICE 2,048,418

SHOCK ABSORBER STRUT

Kenneth W. Warren, South Bend, Ind., assignor to Bendix Aviation Corporation, South Bend, Ind., a corporation of Delaware Application February 18, 1932, Serial No. 593,913

16 Claims. (Cl. 267—34)

This invention relates to shock absorbers and more particularly to shock absorbing struts for airplanes.

Heretofore, shock absorbing struts for aircraft have been provided with a single metering orifice. Struts of this type build up excessive loads at some point in the stroke. Others are provided with a single orifice and a metering pin coacting therewith which provides a relatively smooth action. The cost of production of the latter type is relatively high.

It is the aim of the present invention to overcome these objections by providing a shock strut affording smooth controlled action comprising but few parts constructed and arranged to absorb energy without building up excessive loads.

This invention broadly comprehends a shock absorber especially adapted for aircraft, incorporating both a liquid damping means for absorbing and dissipating the initial landing shock, and a resilient means for supporting the load, effective after the initial shock.

An important object of the invention is to provide relatively movable parts and means associated therewith including a plurality of spaced metering devices arranged to absorb and dissipate energy without building up excessive loads.

An important feature of the invention is a strut having a movable piston therein provided with an orifice and a series of diaphragms within the strut having orifices of successively varying area, the diaphragms being arranged back of the piston and suitably spaced.

Another important feature is a taxying element arranged within the strut resulting in small over-all diameter, presenting a cleaner appearance, and affording simplification of cowling attachment.

Yet another feature of the invention is the arrangement of the taxying element within the casing, so that it does not come into play until near the end of the piston stroke with the strut partially collapsed and the provision of a shoulder within the strut to limit the compression of the taxying spring.

Other objects of the invention will appear from the following description taken in connection with the drawing, which forms a part of this specification, and in which:

Figure 1 is a vertical sectional view of a shock absorbing strut embodying the invention, and Figure 2 is a fragmentary view of a strut illustrating a modification of the invention.

Referring to the drawing for more specific details of the invention, 10 represents a cylindrical casing having threaded or otherwise secured on one end a cap 12 provided with a clevice 14 for the attachment of a landing gear, not shown. The diameter of the casing is slightly enlarged as shown at 16 to provide a shoulder 18 and the other end of the casing has an enlarged portion 20 provided with a shoulder 22, the portion 20 being internally threaded as indicated at 24.

As shown, a coil spring 26 is slipped in the casing 10. This spring has one end seated on the cap 14 and its other end extends beyond the shoulder 18 into the enlarged portion 16. When the spring is fully compressed it is confined within the area between the cap 14 and the shoulder 18, as will be hereinafter explained.

A cylindrical casing 28 has s'tably secured on one end a piston 30 provided with an orifice 32 and the other end of the casing is closed by cap 34 provided with a clevice 36 for attachment to the fuselage of an airplane, not shown. Arranged within the casing 28 in spaced relation, are diaphragms 38 and 40 provided with metering orifices 42 and 44 and positioned in the wall of the casing at a suitable point is a filling opening having threaded therein a plug 46. The metering orifices 32, 42 and 44 are graduated in size, the larger of the orifices being in the piston.

The cylindrical casing 28 telescopes the cylindrical casing 10 with the piston 30 movable smoothly within the enlarged portion 16 of the casing 10. The casings are secured together by a packing ring 48 threaded in the enlarged portion 20 on the casing 10 with suitable packing material 50 interposed between the packing ring and the shoulder 22.

When the strut is in an extended position, the cylindrical casing 10 is completely filled with oil to a level above the piston 30. When landing, the cylindrical casings 10 and 28 telescope. This action forces the oil in casing 10 through the orifice 32 in the piston into the casing 28. As the velocity of the piston decreases, due to the absorption and dissipation of energy, the orifice area required is less, hence to successively decrease the orifice area as required, the cylinder 28 has positioned therein, a series of diaphragms provided with orifices, the areas of which are proportioned to absorb and dissipate the necessary energy without building up excessive loads.

A modification of the invention is illustrated in Figure 2. In this modification, the diaphragms 38 and 40 are removed from the cylindrical casing 28 and a piston 52 having an orifice 54 is positioned on the spring 26. When the piston 30 has travelled a sufficient distance to abut the piston 52, carried by the spring 26, the orifice 54 will be brought into action and continue to the end of the stroke.

The relative areas of the orifices 32 and 54 may be varied, likewise the distance of travel of the piston 30 before abutting piston 52 may be varied by varying the length of the spring so as to produce the desired result.

In both the preferred and modified forms of the invention, the initial landing shock is effectively absorbed and dissipated by metering oil through orifices of successively decreasing area, and the taxying shocks may be readily absorbed by the resilient means or the spring, the compression of which is limited by reason of the shoulder in the cylinder 10, providing a suitable abutment for the piston.

Although this invention has been described in connection with certain specific embodiments, the principles involved are susceptible to numerous other applications that will readily occur to persons skilled in the art. The invention is, therefore, to be limited only by the scope of the appended claims.

Having thus described the various features of the invention, what I claim and desire to secure by Letters Patent is:

1. A shock absorbing strut comprising telescopic members for absorbing and dissipating the initial shock of landing, including successively operative elements rigidly connected to one of said members and arranged to absorb and dissipate energy without building up excessive loads, and means for resiliently supporting the load effective after the initial shock.

2. A shock absorbing strut comprising telescopic casings, liquid damping means within for absorbing and dissipating the initial shock including means rigidly connected to one of said casings for successively absorbing and dissipating energy uniformly throughout the stroke without building up excessive loads and means for resiliently supporting the load effective after the initial landing shock.

3. A shock absorbing strut comprising telescopic casings, means for absorbing and dissipating the initial landing shock including a quantity of damping liquid partially filling the casings, means carried by one of the casings and rigidly fixed thereto for successively metering the liquid to absorb and dissipate the energy without building up excessive loads, and means for resiliently supporting the load effective only after the initial landing shock.

4. A shock absorber comprising telescopic casings, an apertured piston carried by one of the casings, and a plurality of diaphragms arranged in spaced relation back of the piston, each diaphragm having an aperture of a different diameter.

5. A shock absorbing strut comprising telescopic casings, a piston carried by one of the casings, diaphragms in the casing carrying the piston, the piston and diaphragms each having an orifice, the orifices successively decreasing in area.

6. A shock absorbing strut comprising a tubular casing closed at one end, an apertured piston on the other end and a plurality of diaphragms arranged within the casing, the piston and diaphragms each having an orifice, the orifices successively decreasing in area.

7. A shock absorbing strut comprising a tubular casing closed at one end, a piston on the other end and a plurality of diaphragms in the casing, the piston and diaphragms each having an orifice, the orifices successively varying in area.

8. A shock absorbing strut comprising a cylindrical casing having a double diametral bore providing a shoulder, a spring seated in the smaller bore and extending beyond the shoulder into the larger bore, a cylindrical casing having a piston on one end movable within the larger bore, diaphragms arranged in the cylindrical casing back of the piston, the piston and diaphragms each having an aperture, the apertures successively decreasing in area.

9. A shock absorbing strut comprising telescopic casings, a spring in one casing, an apertured piston carried by the other casing and means engageable with the piston for decreasing the area of the aperture.

10. A shock absorbing strut comprising telescopic casings, a spring positioned in one of the casings, a piston carried by the other casing, a movable diaphragm on the spring, the piston and diaphragm having orifices of different diameters.

11. A shock absorbing strut comprising telescopic casings, an apertured piston carried by one of the casings, a spring positioned in the other casing, and a movable apertured diaphragm supported by the spring.

12. A shock absorbing strut comprising telescopic cylindrical casings, one of the casings having a double diametral bore, a shoulder provided by the double diameter bore, a spring in the smaller bore, a movable apertured diaphragm supported by the spring above the shoulder, an apertured piston secured to the inner end of the other casing adaptable for movement in the larger bore and for cooperation with the movable diaphragm.

13. A shock absorbing strut comprising telescopic casings, a spring positioned in one of the casings, an apertured piston on the inner end of the other casing, and apertured diaphragms arranged within one of the casings in spaced relation back of the piston, the apertures in the piston and diaphragms having different areas.

14. A shock absorbing strut comprising telescopic casings, one of the casings closed at one end and provided with a double diametral bore, a shoulder formed by the double diametral bore, a spring seated in the smaller bore and extending into the larger bore, another casing closed at one end, a piston on the other end adaptable for movement in the larger bore, diaphragms in the second casing arranged in spaced relation and having orifices successively decreasing in area.

15. A shock absorbing strut comprising means for absorbing and dissipating the initial shock of landing, including a plurality of successively operative elements arranged in series and rigid spaced relation to absorb and dissipate energy without building up excessive loads.

16. A shock absorbing strut comprising telescopic casings, means for absorbing and dissipating the initial landing shock including a quantity of damping liquid partially filling the casings, and a plurality of means carried by and rigidly secured to one of the casings for successively metering the liquid to absorb and dissipate the energy without building up excessive loads.

KENNETH W. WARREN.

CERTIFICATE OF CORRECTION.

Patent No. 2,048,418.　　　　　　　　　　　　　　　　July 21, 1936.

KENNETH W. WARREN.

It is hereby certified that error appears in the printed specification of the above numbered patent requiring correction as follows: Page 2, second column, line 70, claim 16, after the word "casings" insert arranged in series; and that the said Letters Patent should be read with this correction therein that the same may conform to the record of the case in the Patent Office.

Signed and sealed this 13th day of July, A. D. 1937.

Henry Van Arsdale (Seal)　　　　　　　　　　　　　　　Acting Commissioner of Patents.